United States Patent [19]
Mumpower et al.

[11] Patent Number: 5,374,459
[45] Date of Patent: Dec. 20, 1994

[54] PACKAGING MATERIAL FOR LONG-TERM STORAGE OF FOOD PRODUCTS

[75] Inventors: Edward L. Mumpower, Moore; Gordon V. Sharps, Jr., Greer; Neal E. McCormick, Simpsonville; Barry J. Grant, Greenville, all of S.C.

[73] Assignee: W. R. Grace & Co.-Conn., Duncan, S.C.

[21] Appl. No.: 43,417

[22] Filed: Apr. 6, 1993

[51] Int. Cl.$^5$ .............. B29D 22/00; B32B 27/08
[52] U.S. Cl. .................. 428/36.7; 428/349; 428/516; 428/518; 428/483; 428/475.5; 428/475.8; 428/910
[58] Field of Search ............ 428/516, 518, 910, 349, 428/36.7

[56] References Cited

U.S. PATENT DOCUMENTS

| | | | |
|---|---|---|---|
| 4,457,960 | 7/1984 | Newsome | 428/35 |
| 4,495,249 | 1/1985 | Ohya et al. | 428/516 |
| 4,724,185 | 2/1988 | Shah | 428/339 |
| 4,729,926 | 3/1988 | Koteles et al. | 428/474 |

Primary Examiner—P. C. Sluby
Attorney, Agent, or Firm—L. L. Wasatonic; L. G. Legg; M. B. Quatt

[57] ABSTRACT

A thermoplastic laminate suitable for long-term storage of food products includes a first substrate having a core layer of ethylene vinyl alcohol copolymer, two interior adhesive layers, and two surface layers each comprising a blend of a linear ethylene alpha olefin copolymer and an ethylene unsaturated ester copolymer; and a second substrate comprising an olefinic material of monolayer or multilayer construction, and preferably of substantially the same composition as the first substrate; and the second substrate bonded to the first substrate preferably by means of a conventional lamination adhesive.

19 Claims, 1 Drawing Sheet

PACKAGING MATERIAL FOR LONG-TERM STORAGE OF FOOD PRODUCTS

BACKGROUND OF THE INVENTION

This invention relates generally to the art of packaging films and more particularly to films useful in the packaging of food and other products.

It is common practice in packaging many goods, including food items, to use what is generally known as form-fill-seal equipment. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art and the end of the tube is sealed together by pairs of transverse heat seals which are vertically spaced apart, or closed by metal clips. At this point the tube is filled with a measured quantity of the product to be packaged. A second heat sealing or clipping operation, typically performed after the filled tube has been downwardly advanced, completes enclosure of the product. Simultaneously with or shortly after the second transverse heat sealing or clipping step the tube is completely transversely severed by known cutting means. Thereafter the tube is downwardly advanced and the cycle is successively repeated so as to form a multiplicity of individually packaged products.

Horizontal form-fill-seal equipment is also commonly used.

Manufacturers of form-fill-seal equipment include Hayssen and Kartridge Pak. The latter is used to make a clipped pouch.

Flexible packaging material useful for this as well as other applications typically must meet stringent requirements imposed by the particular food or other article to be packaged. In some cases, the package must be capable of adequately protecting the food item after packaging and through the distribution cycle until the packaged product reaches the end user at point of sale.

Additionally, products such as those described above are sometimes introduced into the form tube at relatively high temperatures of about 200° F. The formed package must be able to withstand the still relatively high temperatures immediately after packaging, and subsequent cooling operations to bring the package to room temperature or other desired temperature range. Dimensional stability of the packaging material in both low and high temperature regimes is sometimes necessary to prevent warping and distortion of the package after filling.

The flexible material must also have sufficient abuse resistance to physical and mechanical abuse imposed by the entire form-fill-seal or other packaging system.

Yet another requirement of packaging material, especially in form-fill-seal systems, is good heat sealability with respect to the longitudinal and transverse (if present) heat seals, which are typically subjected to loading forces from the introduced product such as food product, soon after the heat seal is formed.

Limited oxygen transmission through the packaging material under both low and high humidity conditions is an essential feature of a packaging material for long-term storage of oxygen sensitive food products. This oxygen barrier feature should maintain the packaged food products for an extended period.

Limited moisture transmission through the packaging material is also often an important feature of a packaging material for such long-term storage.

Of interest is U.S. Pat. No. 4,729,926 issued to Koteles et al which discloses a thermoplastic laminate with two substrates, one of the substrates having EVOH, and each of the substrates having an outer layer of LLDPE.

Also of interest is U.S. Pat. No. 4,724,185 issued to Shah which discloses a coextruded multilayer film with a core layer of EVOH, intermediate adhesive layers, and outer layers of a blend of LLDPE, linear medium density polyethylene, and EVA.

Also of interest is U.S. Pat. No. 4,457,960 issued to Newsome which discloses the use of EVOH and EVOH blends in a multiple layer film. The film may be made as shrinkable film, and may be melt extruded. The outside layer of the multiple layer film may be a blend of linear low density polyethylene (LLDPE) and EVA.

Also of interest is U.S. Pat. No. 4,495,249 issued to Ohya et al and disclosing a multilayer laminate film with a core layer of a saponified copolymer of ethylene and vinyl acetate, and including two outer layers of a mixture of EVA and LLDPE. The multilayer laminate film of this reference can be made heat shrinkable and has gas barrier properties.

It is an object of the present invention to provide a thermoplastic laminate suitable for the packaging of food and other products.

It is a further object of the present invention to provide a thermoplastic laminate useful in connection with form-fill-seal machines.

It is still another object of the present invention to provide a thermoplastic laminate which provides extended shelf life to food products.

It is also an object of the present invention to provide a thermoplastic laminate with good oxygen and moisture barrier properties.

SUMMARY OF THE INVENTION

A thermoplastic laminate, in accordance with the present invention, comprises a first substrate having a core layer of ethylene vinyl alcohol copolymer; two interior adhesive layers; and two surface layers each comprising a blend of a linear ethylene alpha olefin copolymer and an ethylene unsaturated ester copolymer; a second substrate comprising an olefinic material; and the second substrate bonded to the first substrate preferably by means of a conventional lamination adhesive.

DEFINITIONS

The term "linear ethylene alpha olefin copolymer" (EAO) as used herein includes such materials as linear low density polyethylene [LLDPE], very low and ultra low density polyethylene [VLDPE], and metallocene catalyzed polymers such as those supplied by Exxon. Tafmer materials supplied by Mitsui, being elastomers, can also be used instead of the above materials. These materials generally include copolymers of ethylene with one or more comonomers selected from $C_4$ to $C_{10}$ alphaolefins such as butene-1, hexene-1, octene-1, etc. in which the molecules of the copolymers comprise long chains with relatively few side chain branches or crosslinked structures. This molecular structure is to be contrasted with conventional low or medium density polyethylenes which are more highly branched than their respective counterparts. "LLDPE" as defined herein has a density usually in the range of from about 0.916 grams per cubic centimeter to about 0.940 grams per cubic centimeter.

The terms "intermediate layer", "interior layer", and the like are used herein to define a layer in a multilayer film bounded on both sides by other layers.

The terms "antiblocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application.

The term "ethylene vinyl alcohol copolymer" is used herein to describe a vinyl alcohol copolymer having an ethylene comonomer, and prepared by for example, hydrolysis of vinyl acetate copolymers, or by chemical reactions with polyvinyl alcohol. Other oxygen barrier materials can also be used to some extent in the practice of this invention, depending on process conditions and desired end use. These include for example vinylidene chloride copolymers (saran), polyalkylene carbonate, polyester, and nylon.

The terms "ethylene vinyl acetate copolymer", "EVA" and the like is used herein to refer to a copolymer formed from ethylene and vinyl acetate monomers wherein the ethylene derived units in the copolymer are present in major amounts, preferably between about 60% and 98% by weight, and the vinyl acetate derived units in the copolymer are present in minor amounts, preferably between about 2% and 40% by weight. Other ethylene unsaturated ester copolymers can also be used to some extent in the practice of this invention, depending on process conditions and desired end use. These include for example ethylene methyl acrylate copolymer, and ethylene butyl acrylate copolymer.

The term "oriented" and the like is used herein to define a material which, when heated to an appropriate temperature above room temperature (for example 96° C.), will have free shrink of 5% or greater in at least one linear direction.

The substrates described herein are preferably electronically crosslinked, and preferably oriented, by means well known in the art.

BRIEF DESCRIPTIONS OF THE DRAWINGS

Details of the present invention are provided by reference to the drawing figures wherein:

FIG. 1 is a schematic cross section of an embodiment of a multilayer laminate of the invention; and FIG. 2 is a schematic cross section of a preferred embodiment of a multilayer laminate in accordance with the invention.

DESCRIPTION OF THE PREFERRED EMBODIMENTS

Figure 1:
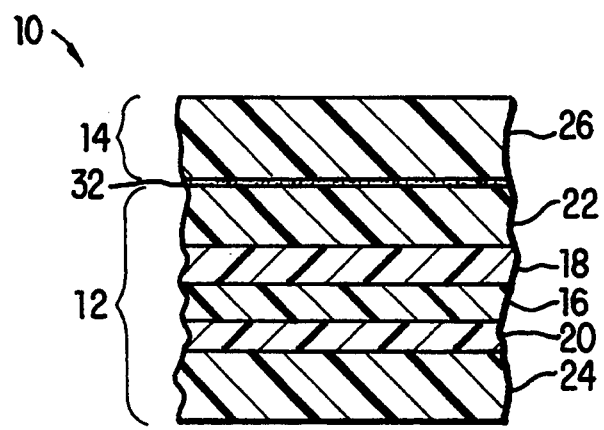

The structure depicted in FIG. 1 is directed to a thermoplastic laminate 10 having a first substrate 12 and second substrate 14.

First substrate 12 is a multilayer film having the generalized structure of A/B/C/B/A where A is an outer layer, B is an intermediate adhesive layer, and C is a core layer containing an oxygen barrier material. The total thickness of the multilayer film is preferably between about 0.5 and 2.0 mils, and more preferably between about 0.75 and 1.5 mils. Even more preferably, the multilayer film of the present invention is about 1.5 mil thick.

Preferably, core layer 16 comprises an ethylene vinyl alcohol copolymer. Core layer 16 preferably forms between about 5% and 25% of the total film thickness. Thicknesses less than about 5% result in a very thin film with possible voids in the barrier material. Thicknesses greater than about 25% make the film difficult to stretch or rack, and also result in increased cost due to the expensive barrier component.

Intermediate layers 18 and 20 are polymeric adhesives, preferably acid or acid anhydride-modified polymeric material which can bond the core layer 16 to the outer layers 22 and 24 respectively.

Outer layers 22 and 24 comprise a blend of a linear ethylene alpha olefin copolymer and an ethylene unsaturated ester copolymer (EUE). A preferred EAO is LLDPE or a blend of two LLDPE resins. A preferred EUE is EVA, with a vinyl acetate (VA) content of preferably between about 3.0 and 9% by weight and more preferably between about 3.3 and 5% by weight. At VA contents greater than about 9%, the multilayer film becomes too sticky or tacky for many applications, or requires the use of relatively large amounts of slip and antiblock additives.

If crosslinked, at least one layer of the film is preferably irradiated with between about 0.5 and 13 megarads (M.R.) of irradiation, even more preferably between about 1 and 6 M.R. If oriented, any crosslinking is done preferably prior to orientation of the film. Orientation is done by racking or stretching the film at a racking ratio of preferably between about 3.0 and about 7.0 times the original dimensions of the film in the longitudinal and/or transverse directions.

Layer 24 preferably includes a small amount of additives. Preferred is about 15% of a masterbatch concentrate containing slip and antiblock additives compounded with EVA of about 3.3% vinyl acetate content by weight. Layer 22 has preferably no such additives, or at least a sufficiently small amount so as not to substantially impair the subsequent bonding of first substrate 12 to second substrate 14.

Figure 2:
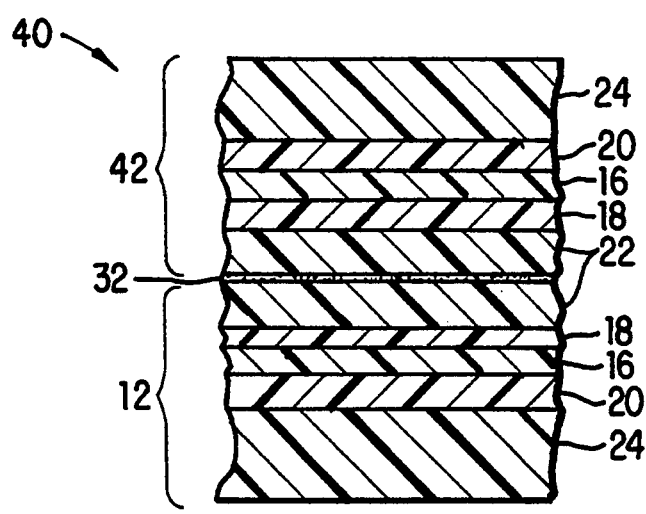

Referring now to second substrate 14 of FIG. 1, this can comprise a monolayer film 26 as shown in FIG. 1, or a multilayer film 42 as shown in FIG. 2. If monolayer, it can comprise any of the materials discussed above. If multilayer, it preferably is substantially the same as the first substrate 12. This example is shown in FIG. 2.

The adhesive layer 32 representing, for example, a lamination adhesive, serves to laminate first substrate 12 to second substrate 14 or 42. The adhesive layer 32 is shown with exaggerated thickness in solid shading for purposes of clarity. In practice, conventional lamination adhesives will form very thin adhesive layers. A preferred material is a polyurethane adhesive. In some cases, other bonding techniques (corona treatment, heat lamination, etc.) can also be employed.

In the preferred embodiments described above, the EAO/EUE blend provides high moisture barrier properties often desirable in food packaging.

Examples of laminates produced in accordance with the present invention are given below.

EXAMPLE 1

A film was prepared by blending 50% of LLDPE (Dowlex 2045), 25% LLDPE (Dowlex 2037) and 10% EVA having a vinyl acetate content of about 3.3%, blended with about 15% of a masterbatch concentrate containing slip and antiblock additives compounded with EVA of about 3.3% vinyl acetate content by weight. This outside blend layer, shown as layer 24 in FIGS. 1 and 2, was coextruded with a core layer 16 containing a blend of 90% EVOH (EVAL LC-F101A from EVALCA) and 10% of a nylon 6/nylon 12 copolymer (Grillon CF-6S from Emser) which is a caprolactam laurolactam copolymer, and intermediate polymeric adhesive layers 18 and 20 comprising a polymeric adhesive (Admer SF 700 A from Mitsui). The Dowlex 2045 and 2037 may be obtained from Dow Chemical Company. These are copolymers of ethylene and octene. Outer layer 22, coextruded with these other layers, was like layer 24 in composition but without the additive masterbatch concentrate.

The EVA of the outside blend layer is commercially available from Rexene under the trade designation PE 1335. The vinyl acetate content of this EVA is about 3.3% by weight.

The EVOH of the core blend layer had an ethylene content of about 32%. Other suitable EVOH resins include EVAL E, EVAL H, and EVAL K, as well as blends of the above, and preferably such resins or blends having a melt index of between about 1 to 4 grams per ten minutes (ASTM 1238). The Grillon CF-6S is a nylon copolymer having about 60% nylon 6 and about 40% nylon 12 by weight. Although not necessary for the practice of the invention, the nylon copolymer is useful, especially when the core layer is very thin, in minimizing any pinholes that can sometimes occur in the core layer during processing.

Other suitable polymeric adhesives 32 include Bynel CXA 4104 from Du Pont.

A preferred layer gauge ratio for first substrate 12 is 4/1/1/1/2 (beginning with outer layer 24 and going to layer 22).

The polymer melt from the coextrusion die was then cooled and cast into a solid tape which was irradiated with about 3 megarads of irradiation. The tape was then heated to about 115° C. in an oven and blown into a bubble. The bubble was expanded to about 3.2 times its original dimensions in both the machine (longitudinal) and transverse directions, and then deflated and ply separated into single wound film rolls. The final film had a thickness of about 1.5 mil.

A second film 14 is prepared by extruding an EAO or EUE.

This second film is then adhered to layer 22 of the first substrate 12 by application of a polyurethane or other conventional lamination adhesive to either or both of layers 22 of the first substrate, and the surface of second film 14 to be bonded to first substrate 12. Bonding is accomplished by techniques well known in the lamination art. The final laminate has a thickness of about 3 mils.

EXAMPLE 2

A laminate similar to that of Example 1 was prepared in a similar procedure, but in which the second substrate 42 (see FIG. 2) is substantially the same as first substrate 12.

Coextrusion, crosslinking, and orientation steps are done by processes well known in the art.

Various changes and modifications to the invention can be made by one skilled in the art without departing from the scope of the claims as presented below.

We claim:
1. A thermoplastic laminate comprising:
   a) a first substrate including:
      i) a core layer of an oxygen barrier material;
      ii) two intermediate layers of an acid or acid anhydride-modified polymeric adhesive; and
      iii) two outer layers of a blend of linear ethylene alpha olefin copolymer and ethylene unsaturated ester copolymer; and
   b) a second substrate bonded to the first substrate and comprising an ethylenic material.
2. A laminate according to claim 1 wherein the core layer comprises ethylene vinyl alcohol copolymer.
3. A laminate according to claim 1 wherein the intermediate layer comprises a polyolefin based, acid or acid anhydride grafted polymeric adhesive.
4. A laminate according to claim 1 wherein the linear ethylene alpha olefin copolymer comprises a linear low density polyethylene.
5. A laminate according to claim 1 wherein the ethylene unsaturated ester copolymer comprises ethylene vinyl acetate copolymer.
6. A laminate according to claim 1 wherein the olefinic material of the second substrate comprises a blend of linear ethylene alpha olefin copolymer and ethylene unsaturated ester copolymer.
7. A laminate according to claim 1 wherein the first substrate is bonded to the second substrate by a conventional lamination adhesive.
8. A laminate according to claim 1 wherein the first substrate or second substrate is crosslinked.
9. A laminate according to claim 1 wherein the first substrate or second substrate is oriented.
10. A package made from the laminate of claim 1.
11. A thermoplastic laminate comprising:
   a) a first substrate including:
      i) a core layer of an oxygen barrier material;
      ii) two intermediate layers of an acid or acid anhydride-modified polymeric adhesive; and
      iii) two outer layers of a blend of linear ethylene alpha olefin copolymer and ethylene unsaturated ester copolymer; and
   b) a second substrate bonded to the first substrate and comprising the same layers having substantially the same composition as the first substrate.
12. A laminate according to claim 11 wherein the core layer comprises ethylene vinyl alcohol copolymer.
13. A laminate according to claim 11 wherein the intermediate layer comprises a polyolefin based, acid or acid anhydride grafted polymeric adhesive.
14. A laminate according to claim 11 wherein the linear ethylene alpha olefin copolymer comprises a linear low density polyethylene.
15. A laminate according to claim 11 wherein the ethylene unsaturated ester copolymer comprises ethylene vinyl acetate copolymer.
16. A laminate according to claim 11 wherein the first substrate is bonded to the second substrate by a conventional lamination adhesive.
17. A laminate according to claim 11 wherein the first substrate or second substrate is crosslinked.
18. A laminate according to claim 11 wherein the first substrate or second substrate is oriented.
19. A package made from the laminate of claim 11.

* * * * *